US011391430B2

(12) United States Patent
Lim et al.

(10) Patent No.: US 11,391,430 B2
(45) Date of Patent: Jul. 19, 2022

(54) LIGHT EMITTING MODULE FOR VEHICLE AND LAMP DEVICE INCLUDING THE SAME

(71) Applicants: HYUNDAI MOTOR COMPANY, Seoul (KR); KIA MOTORS CORPORATION, Seoul (KR)

(72) Inventors: Jung Wook Lim, Seoul (KR); Byoung Suk Ahn, Gwacheon-si (KR); Seung Sik Han, Hwaseong-si (KR); Sung Ho Park, Seoul (KR); Ki Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/187,238

(22) Filed: Feb. 26, 2021

(65) Prior Publication Data

US 2022/0107069 A1 Apr. 7, 2022

(30) Foreign Application Priority Data

Oct. 6, 2020 (KR) ........................ 10-2020-0128995

(51) Int. Cl.

| | |
|---|---|
| ***B60Q 1/04*** | (2006.01) |
| ***F21S 41/20*** | (2018.01) |
| ***F21S 41/25*** | (2018.01) |
| ***F21S 41/32*** | (2018.01) |
| *F21W 102/13* | (2018.01) |

(52) U.S. Cl.
CPC ............. *F21S 41/285* (2018.01); *F21S 41/25* (2018.01); *F21S 41/32* (2018.01); *F21W 2102/13* (2018.01)

(58) Field of Classification Search
None
See application file for complete search history.

(56) References Cited

U.S. PATENT DOCUMENTS

2013/0083553 A1* 4/2013 Sekiguchi ............ B60Q 1/0029 362/517
2015/0323147 A1* 11/2015 Kanayama .............. F21V 11/16 362/487
2016/0040848 A1* 2/2016 Tsukamoto ............. F21S 41/68 362/509
2017/0227184 A1* 8/2017 Ishida ..................... F21S 41/36
2017/0276309 A1* 9/2017 Nakazawa .............. F21S 41/24
2017/0276310 A1* 9/2017 Nakazawa ............. B60Q 1/143

FOREIGN PATENT DOCUMENTS

KR 10-0803310 2/2008

* cited by examiner

*Primary Examiner* — Elmito Breval
(74) *Attorney, Agent, or Firm* — Fox Rothschild LLP

(57) ABSTRACT

A light emitting module for a vehicle is disclosed. The light emitting module includes a first light source configured to generate a first light during an operation, a light concentrator disposed in a forward direction of the first light and configured to change the forward direction of the first light through reflection or refraction, a second light source spaced apart from the first light source and configured to generate a second light in a direction different from the first light, and a lens unit disposed in a forward direction of the second light, and configured to change the forward directions of the first light and the second light.

14 Claims, 9 Drawing Sheets

PRIOR ART

LIGHT EMITTING MODULE FOR VEHICLE AND LAMP DEVICE INCLUDING THE SAME

CROSS-REFERENCE TO RELATED APPLICATION

This application claims priority to and benefit from Korean Patent Application No. 10-2020-0128995, filed on Oct. 6, 2020, the disclosure of which is incorporated herein by reference in its entirety.

TECHNICAL FIELD

The present disclosure relates to a light emitting module for a vehicle and a lamp device including the same, and more particularly to a headlamp device of a vehicle including a plurality of light emitting modules for vehicles.

BACKGROUND

A lamp for a vehicle is adapted to illuminate the area in front of the vehicle in order to enable a driver to safely drive the vehicle. As such a vehicle lamp, there are a headlamp, a rear lamp, etc. The headlamp includes configurations such as a high-beam lamp, a low-beam lamp, a direction indicator lamp, a position lamp, etc.

The design of such a headlamp is being highlighted as an element determining design characteristics of a vehicle and, as such, the design of a headlamp module becomes more complex and diverse.

For such headlamp design, technology for using, in common, a daytime running light (DRL) illuminated in the daytime and high-beam and low-beam lamps illuminated in the nighttime has been developed. However, in this technology, there is a problem in that application of the same design character is difficult due to a difference between illumination areas in which light is irradiated.

The above matters disclosed in this section are merely for enhancement of understanding of the general background of the disclosure and should not be taken as an acknowledgement or any form of suggestion that the matters form the related art already known to a person skilled in the art.

SUMMARY

Therefore, the present disclosure provides a lamp device for a vehicle in which a daytime running light (DRL) is integrated with a headlamp realizing a high beam or a low beam.

In accordance with an aspect of the present disclosure, the above and other objects can be accomplished by the provision of a light emitting module for a vehicle including a first light source for generating light during operation thereof, a light concentrator disposed forwards in an advance direction of light generated from the first light source, to change the advance direction of the light generated from the first light source through reflection or refraction, a second light source disposed to be spaced apart from the first light source, to generate light in a direction different from a light generation direction of the first light source, and a lens unit disposed forwards in an advance direction of the light generated from the second light source, to change the advance directions of the light generated from the first light source and the light generated from the second light source.

The first light source may be disposed rearwardly of the second light source in the advance direction of the light generated therefrom. The light condenser may be a lens for condensing the light generated from the first light source forwards in the advance direction of the light.

The first light source may generate light in a direction different from a direction in which light is generated from the second light source. The light condenser may be a total reflection lens bent to change the advance direction of the light generated from the first light source toward the lens unit and to totally reflect light incident upon an inside thereof.

The first light source may generate light in a direction different from a direction in which light is generated from the second light source. The light condenser may change the advance direction of the light generated from the first light source such that the light advances to the lens unit.

The light condenser may include a curved reflective surface for reflecting light incident thereupon after being generated from the first light source such that the light advances to the lens unit.

The reflective surface of the light condenser may be formed along a parabola having a focus corresponding to the first light source, and may extend between the second light source and the lens unit.

The first light source may be disposed to be spaced apart from the second light source in a direction crossing the light generation direction of the second light source.

The light condenser may be disposed to be prevented from interfering with the light generated from the second light source.

The lens unit may include a primary lens and a secondary lens which are disposed to be spaced apart from each other in a direction parallel to the light generation direction of the second light source.

The primary lens may be a condensing lens for condensing the light generated from the first light source or the second light source. The secondary lens may be a light distribution lens for refracting light passing through the primary lens in a particular direction.

An illumination area in which light passing through the lens unit after being generated from the first light source is irradiated and an illumination area in which light passing through the lens unit after being generated from the second light source may differ from each other.

In accordance with another aspect of the present disclosure, there is provided a lamp device for a vehicle including a plurality of light emitting modules, wherein the plurality of light emitting modules is arranged in a vertical direction or in a lateral direction.

A daytime running lamp may be illuminated by the light generated from the first light source.

A low-beam headlamp may be illuminated by the light generated from the second light source.

A high-beam headlamp may be illuminated by the light generated from the first light source and the light generated from the second light source or is illuminated by the light generated from the first light source.

DRAWINGS

DETAILED DESCRIPTION

Figure 1:
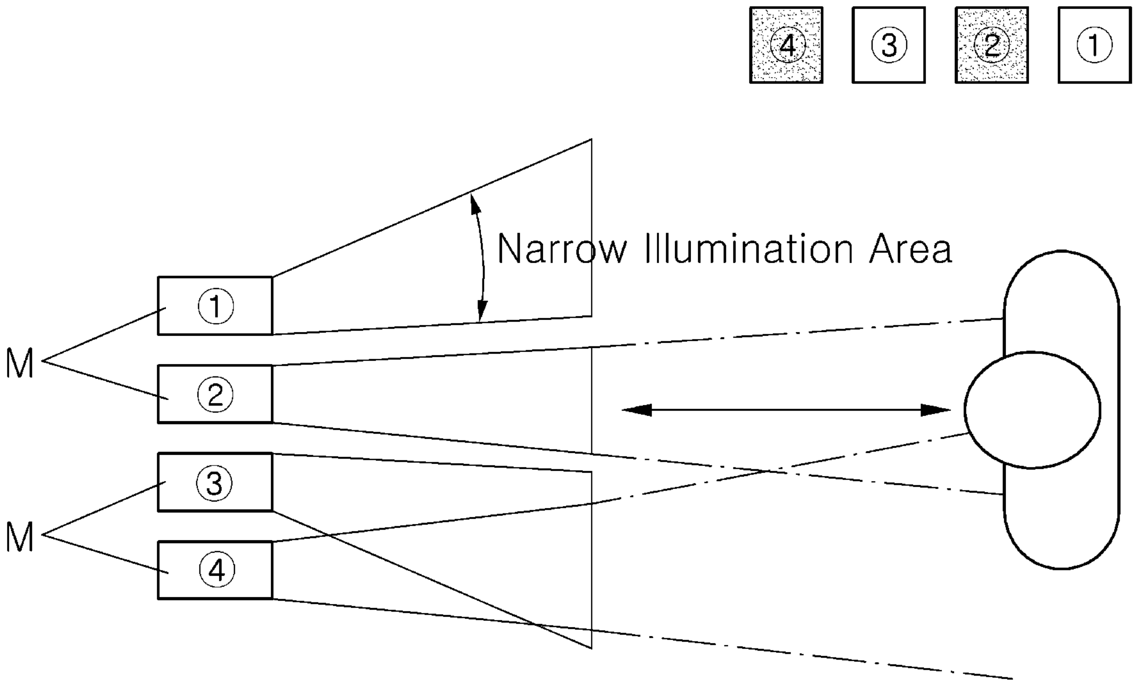
FIG. 1 is a schematic view showing a conventional lamp device for vehicles.

For embodiments of the present disclosure disclosed herein, specific structural or functional descriptions are exemplary to merely describe the embodiments of the present disclosure, and the embodiments of the present disclosure can be implemented in various forms and should not be interpreted as being limited to the embodiments described in the present specification.

As various modifications can be made and diverse embodiments are applicable to the embodiments according to the concept of the present disclosure, specific embodiments will be illustrated with reference to the accompanying drawings and described in detail herein. However, these specific embodiments should not be construed as limiting the embodiments according to the concept of the present disclosure, but should be construed as extending to all modifications, equivalents, and substitutes included in the concept and technological scope of the disclosure.

Terms including ordinal numbers such as first and/or second, etc. can be used to describe various elements, but the elements should not be limited by these terms. The terms are used merely for the purpose of distinguishing one element from another element. For example, a first element may be renamed second element and, similarly, a second element may be renamed first element without departing from the scope of right of the disclosure.

In the case where an element is "connected" or "linked" to another element, it should be understood that the element may be directly connected or linked to the other element, or another element may be present therebetween. On the contrary, in the case where an element is "directly connected" or "directly linked" to another element, it should be understood that no other element is present therebetween. Other expressions describing a relation between constituent elements, such as "between ~" and "immediately between ~" or "adjacent to ~" and "directly adjacent ~", to and the like, should be construed in a similar manner.

It should be noted that terms used herein are merely used to describe a specific embodiment, not to limit the present disclosure. Incidentally, unless clearly used otherwise, singular expressions include a plural meaning. In this application, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Unless defined otherwise, terms used herein including technological or scientific terms have the same meaning as generally understood by those of ordinary skill in the art to which the disclosure pertains. The terms used herein shall be interpreted not only based on the definition of any dictionary but also the meaning that is used in the field to which the disclosure pertains. In addition, unless clearly defined, the terms used herein shall not be interpreted too ideally or formally.

Hereinafter, preferred embodiments of the present disclosure will be described in detail with reference to the accompanying drawings, and the same reference numerals in the drawings designate the same elements, respectively.

FIG. 1 shows a conventional lamp device for vehicles.

Referring to FIG. 1, the conventional lamp device for vehicles may be constituted by a combination of a plurality of light emitting modules M having different illumination areas.

In particular, a part of the plurality of light emitting modules M is adapted for a low-beam lamp, and the other part of the plurality of light emitting modules M is adapted for a DRL. The light emitting modules M are disposed to be spaced apart from one another in a vertical direction and, as such, have individual illumination areas, respectively.

That is, the light emitting modules M are configured to have relatively narrow illumination areas. As a result, an observer approaching the light emitting modules M may observe that only a part of the light emitting modules M, for example, the light emitting modules ② and ④, are illuminated. As such, the realization of uniform illumination may be difficult.

Figure 2:
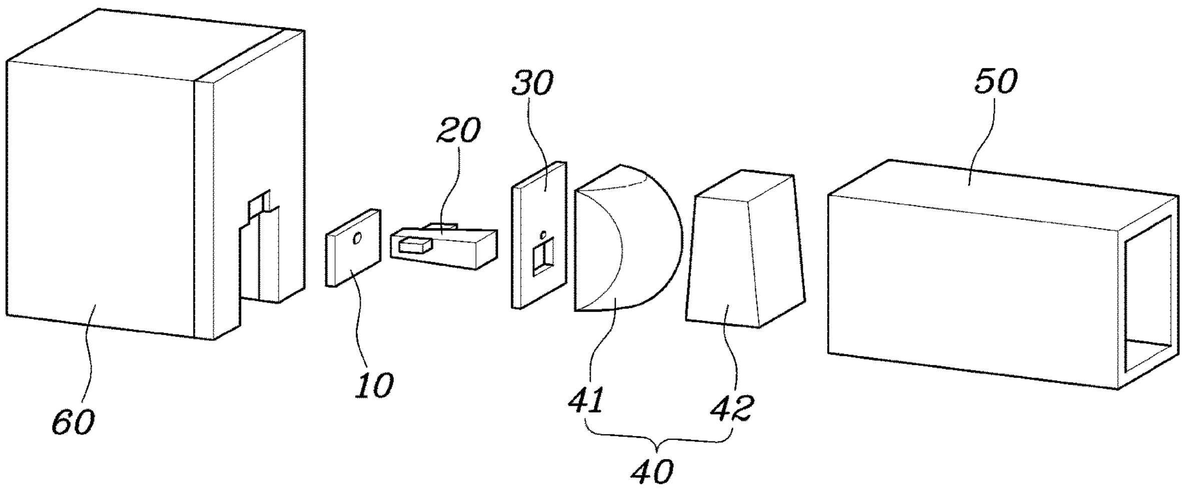
FIG. 2 is an exploded perspective view of a light emitting module for a vehicle in one form of the present disclosure.
Figure 3:
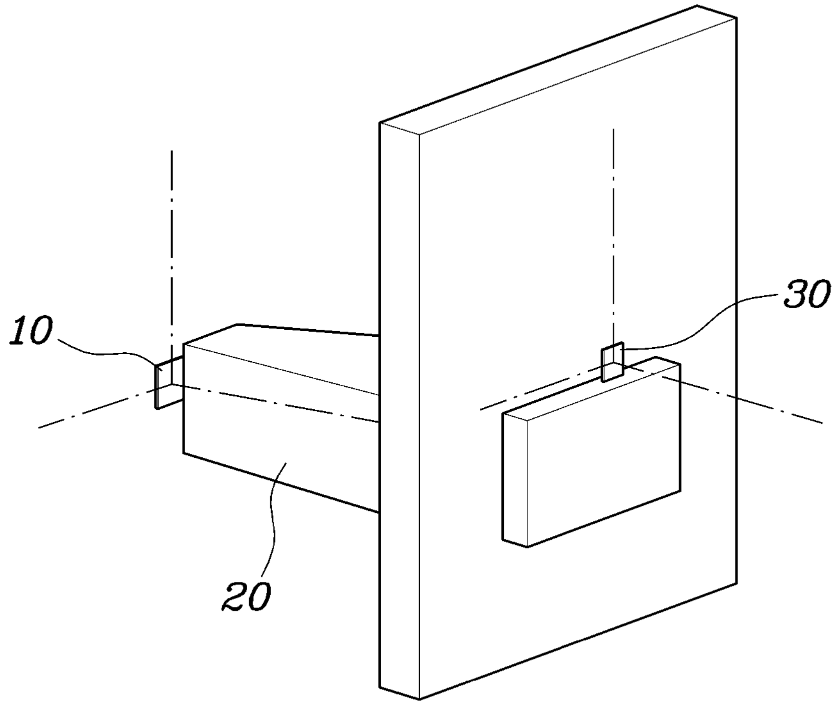
FIG. 3 is a perspective view showing a coupled state of a part of the light emitting module in one form of the present disclosure.

FIG. 2 is an exploded perspective view of a light emitting module M for a vehicle in some forms of the present disclosure. FIG. 3 is a perspective view showing a coupled state of a part of the light emitting module M in some forms of the present disclosure.

Referring to FIGS. 2 and 3, the light emitting module M in some forms of the present disclosure includes a first light source 10 for generating light during operation thereof, a light concentrator 20 disposed forwards in an advance direction of light generated from the first light source 10, to change the advance direction of the light generated from the first light source 10 through reflection or refraction, and a second light source 30 disposed to be spaced apart from the first light source 10, to generate light in a direction different from a light generation direction of the first light source 10. The light emitting module M further includes a lens unit 40 disposed forwards in an advance direction of the light generated from the second light source 30, to change the advance directions of the light generated from the first light source 10 and the light generated from the second light source 30.

The first light source 10 and the second light source 30 may form an image of light having a specific form through application of a point light source or a surface light source.

Each of the first light source 10 and the second light source 30 may include a light emitting diode (LED) or an organic light emitting diode (OLED). In addition, each of the first light source 10 and the second light source 30 may be an LED array module (LAM).

Each of the first light source 10 and the second light source 30 may be coupled to a substrate for controlling supply of current. For example, the substrate may be a printed circuit board (PCB) substrate, without being limited thereto.

Each of the first light source 10 and the second light source 30 may generate light at a specific point, and may emit the light in various directions. Here, the generation and advance directions of the light generated from the first light source 10 or the second light source 30 mean directions corresponding to an effective irradiation area of the first light source 10 or the second source 30, and may be directions opposite to a direction of light intercepted by the substrate, etc.

In particular, when the light emitting module M in some forms of the present disclosure is mounted to a vehicle, the first light source 10 and the second light source 30 may generate light forwardly of the vehicle or may cause the light to advance forwardly of the vehicle.

The light condenser 20 may be disposed in front of the first light source 10, to change the advance direction of light generated from the first light source 10. In particular, the light condenser 20 may guide the light generated from the first light source 10 to be condensed.

In particular, the light condenser 20 may reflect or refract light incident thereupon from the first light source 10 and, as such, may change the advance direction of the light generated from the first light source 10 such that the light advances toward the lens unit 40.

The lens unit 40 may be disposed forwards in the advance direction of light generated from the second light source 30, to change the advance direction of the light generated from the second light source 30. In addition, the lens unit 40 may change the advance direction of light passing through the light condenser 20 after being generated from the first light source 10.

As will be described later, the lens unit 40 may vary the advance directions of light generated from the first light source 10 and light generated from the second light source 30, for condensation of the light or irradiation of the light in a particular direction.

As both the first light source 10 and the second light source 30, from which light beams are incident upon the lens unit 40 in different directions, are included in the light emitting module M in some forms of the present disclosure, there is an effect in which different illumination areas are integrated in a single module.

In detail, the first light source 10 may be disposed to be spaced apart from the second light source 30 in forward and rearward directions with respect to the advance direction of light generated therefrom.

In addition, the first light source 10 and the second light source 30 may be connected to heat dissipation fins 60 and, as such, an enhancement in heat dissipation performance may be achieved.

Furthermore, the first light source, the second light source 30 and the lens unit 40 may be disposed within a case 50 surrounding outer surfaces thereof. The case 50 may have a hollow structure extending in forward and rearward directions, and may be opened forwards such that light generated therein is irradiated forwards.

Figure 4:
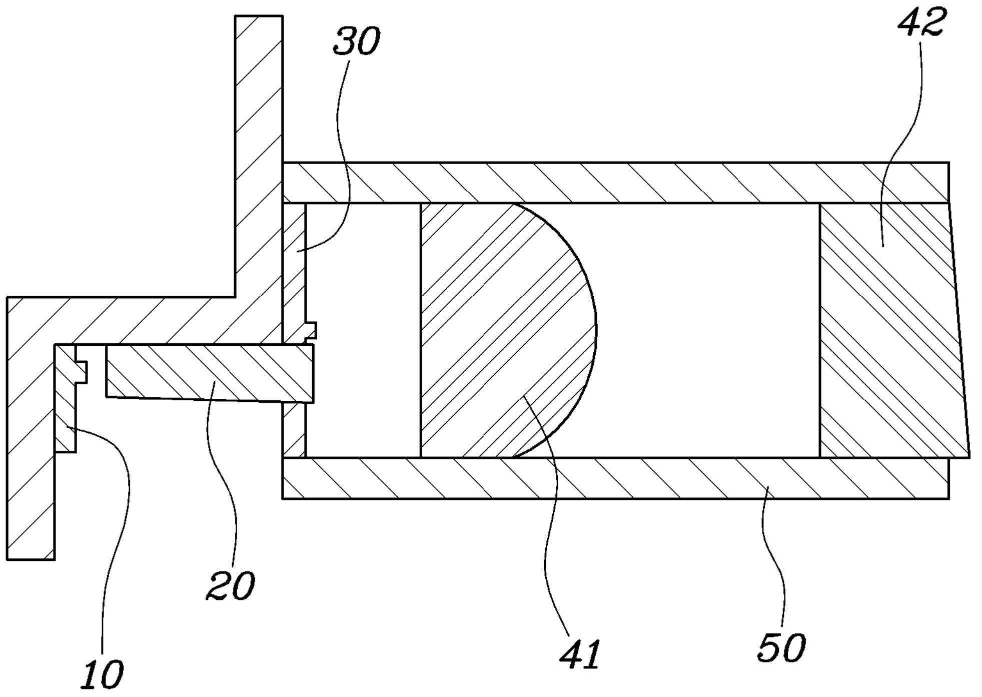
FIGS. 4, 5 and 6 are cross-sectional views showing light emitting modules for vehicles in one form of the present disclosure.
Figure 5:
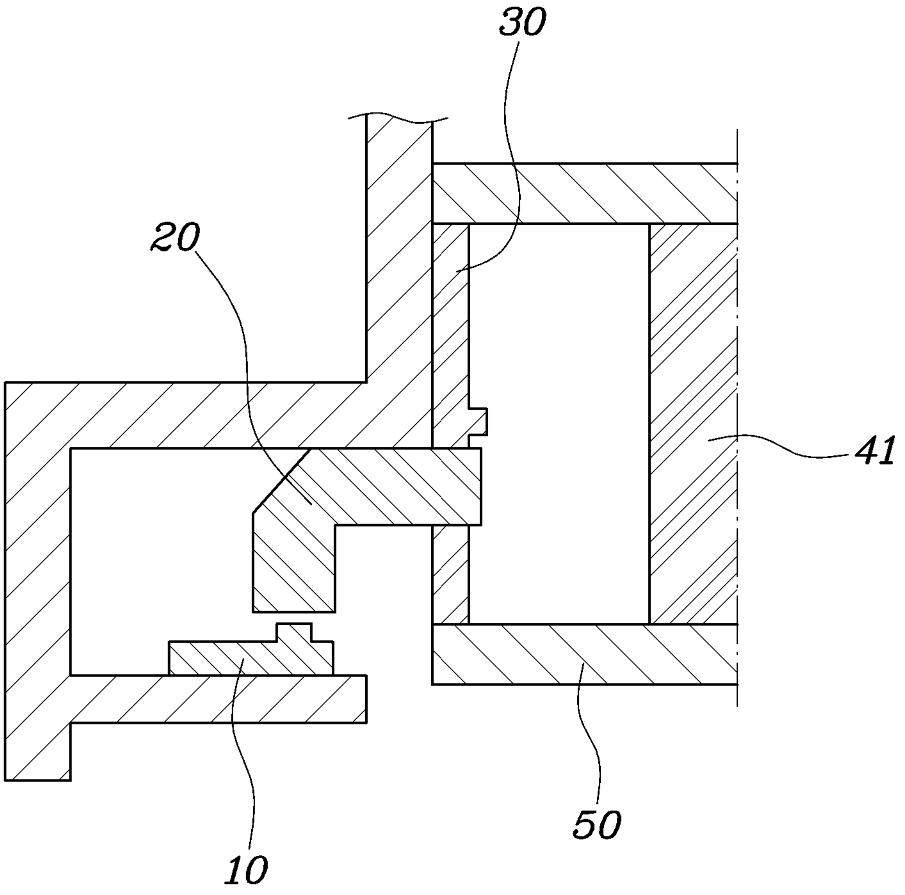
Figure 6:
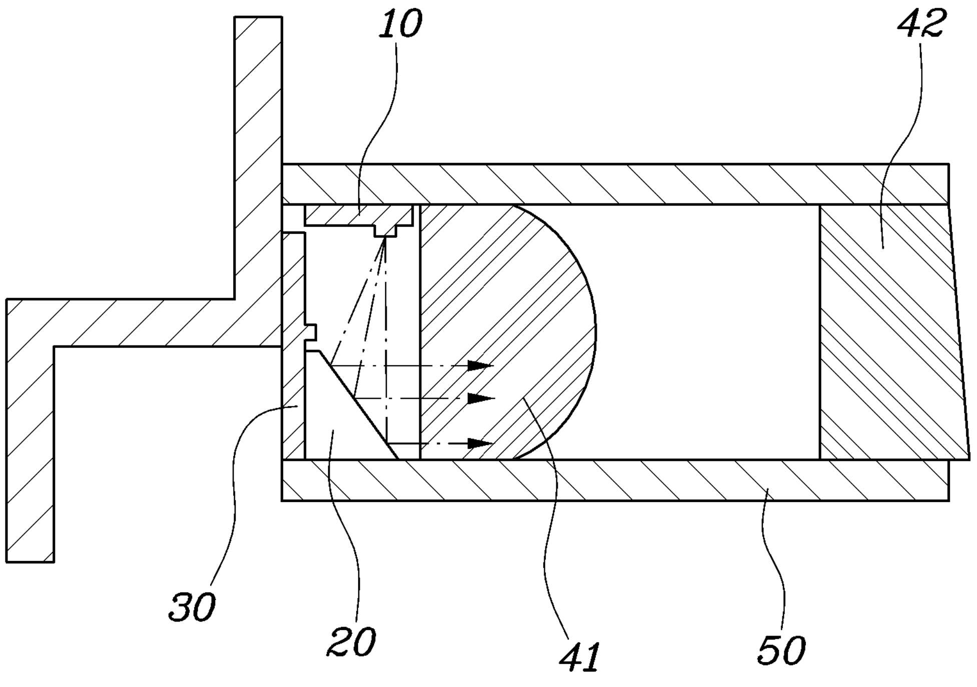

FIGS. 4 to 6 show cross-sectional views of light emitting modules M for vehicles in some forms of the present disclosure, respectively.

Further referring to FIGS. 4 to 6, in an embodiment, as shown in FIG. 5, the first light source 10 may be disposed rearwardly of the second light source 30 in an advance direction of light generated therefrom, and the light condenser 20 may be a lens for condensing the light generated from the first light source 10 forwards in the advance direction of the light.

The light condenser 20 extends toward the first light source 10 at a rear end thereof while extending toward the second light source 30 at a front end thereof and, as such, may extend in forward and rearward directions. The light condenser may be disposed between the first light source 10 and the second light source 30 which are spaced apart from each other in the forward and rearward directions.

In particular, the light condenser 20 may be a total reflection lens for totally reflecting light incident upon an inner surface thereof in an inward direction.

The lens condenser 20 may vary the advance direction of light generated from the first light source 10 through refraction or reflection such that the light is incident upon the lens unit 40. In particular, the lens condenser 20 may condense the light generated from the first light source 10.

In addition, the light condenser 20 may be disposed to be prevented from interfering with light generated from the second light source 30. In particular, the front end of the light condenser 20 may be disposed rearwardly of an effective irradiation angle range of the second light source 30.

In other embodiments, as shown in FIGS. 5 and 6, the first light source 10 may generate light in a direction different from a direction in which light is generated from the second light source 30, and the light condenser 20 may change the advance direction of the light generated from the first light source 10 such that the light advances to the lens unit 40.

The first light source 10 may generate light in a direction crossing the direction in which light is generated from the second light source 30. The light condenser 20 may refract or reflect the light generated from the first light source 10 such that the light generated from the first light source 10 advances to the lens unit 40 disposed forwards in the advance direction of light generated from the second light source 30.

In particular, as shown in FIG. 5, the first light source 10 generates light in a direction different from a direction in which light is generated from the second light source 30, and the light condenser 20 may be a total reflection lens bent to change the advance direction of the light generated from the first light source 10 toward the lens unit 40 and to totally reflect light incident upon an inside thereof.

In this case, the light condenser 20 may use a total reflection lens having a bent shape for application thereof to an imaging optical system package while having a function of totally reflecting light incident upon an inner peripheral surface thereof.

In another embodiment, as shown in FIG. 6, the light condenser 20 may include a curved reflective surface and, as such, may reflect light incident thereupon after being generated from the first light source 10 such that the light advances to the lens unit 40.

The light condenser 20 may be a total reflection lens for totally reflecting light incident upon the reflective surface or a mirror for reflecting light incident upon the reflective surface.

In particular, the reflective surface of the light condenser 20 may be formed along a parabola having a focus corresponding to the first light source 10, and may extend between the second light source 30 and the lens unit 40.

The reflective surface may be formed in accordance with a parabolic equation (y=4px^2) having a focus corresponding to the first light source 10. Accordingly, light reflected from the reflective surface after being generated from the first light source 10 may be incident upon the lens unit 40.

In this case, the light condenser 20 may be formed with a reflective surface such that the light condenser 20 does not interfere with light generated from the second light source 30 or does not interfere with the lens unit 40. In particular, the light condenser 20 may be disposed rearwardly, upwardly or downwardly of an effective irradiation angle of the second light source 30 while being spaced apart from the lens unit 40 in forward and rearward directions.

In addition, a region, upon which light generated from the first light source 10 is incident, at the outside of the reflective surface of the light condenser 20 may include a material or a color absorbing light.

The first light source 10 may be disposed to be spaced apart from the second light source 30 in a direction crossing a light generation direction of the second light source 30.

In particular, the first light source 10 and the second light source 30 may be spaced apart from each other in upward and downward directions. Light beams respectively generated from the first light source 10 and the second light source 30 may be irradiated in different illumination areas while passing through the lens unit 40. In particular, the illumination area of the first light source 10 and the illumination area of the second light source 30 may be spaced apart from each other in upward and downward directions or may be differently formed.

In addition, the light condenser 20 may be disposed to be prevented from interfering with the light generation direction of the second light source 30.

The light condenser 20, upon which light generated from the light source 10 is incident, may be prevented from interfering with light generated from the second light source 30 such that the light condenser 20 does not intercept the light generated from the second light source 30. In particular, the light condenser 20 may be disposed to be beyond the effective irradiation angle range of the second light source.

The lens unit 40 may include a primary lens 41 and a secondary lens 42 which are disposed to be spaced apart from each other in a direction parallel to the light generation direction of the second light source 30.

In detail, the primary lens 41 may be a condensing lens for condensing light passing through the light condenser 20 after being generated from the first light source 10 and light generated from the second light source 30.

The secondary lens 42 may be a light distribution lens for refracting light passing through the primary lens 41 in a particular direction.

The secondary lens 42 may be a light distribution lens disposed forwardly of the primary lens 41 and adapted to refract light passing through the primary lens 41 in a particular direction. In particular, light condensed while passing through the primary lens 41 may be incident upon the secondary lens 42. The secondary lens 42 may guide light incident thereupon after passing through the primary lens 41 to be refracted in a particular direction.

An illumination area in which light passing through the lens unit 40 after being generated from the first light source 10 is irradiated and an illumination area in which light passing through the lens unit 40 after being generated from the second light source 30 may differ from each other.

In an embodiment, light emitted from the first light source 10 may be irradiated in an illumination area disposed at a relatively upper side after passing through the light condenser 20 and the lens unit 40. In addition, the light generated from the second light source 30 may be irradiated in an illumination area disposed at a relatively lower side after passing through the lens unit 40.

In addition, the difference between the illumination area which light passing through the lens unit 40 after being generated from the first light source 10 irradiates and the illumination area which light passing through the lens unit 40 after being generated from the second light source 30 irradiates does not mean that the illumination areas do not overlap with each other at all parts thereof, but means that the illumination areas overlap with each other at parts thereof and, as such, do not coincide with each other.

Figure 7:
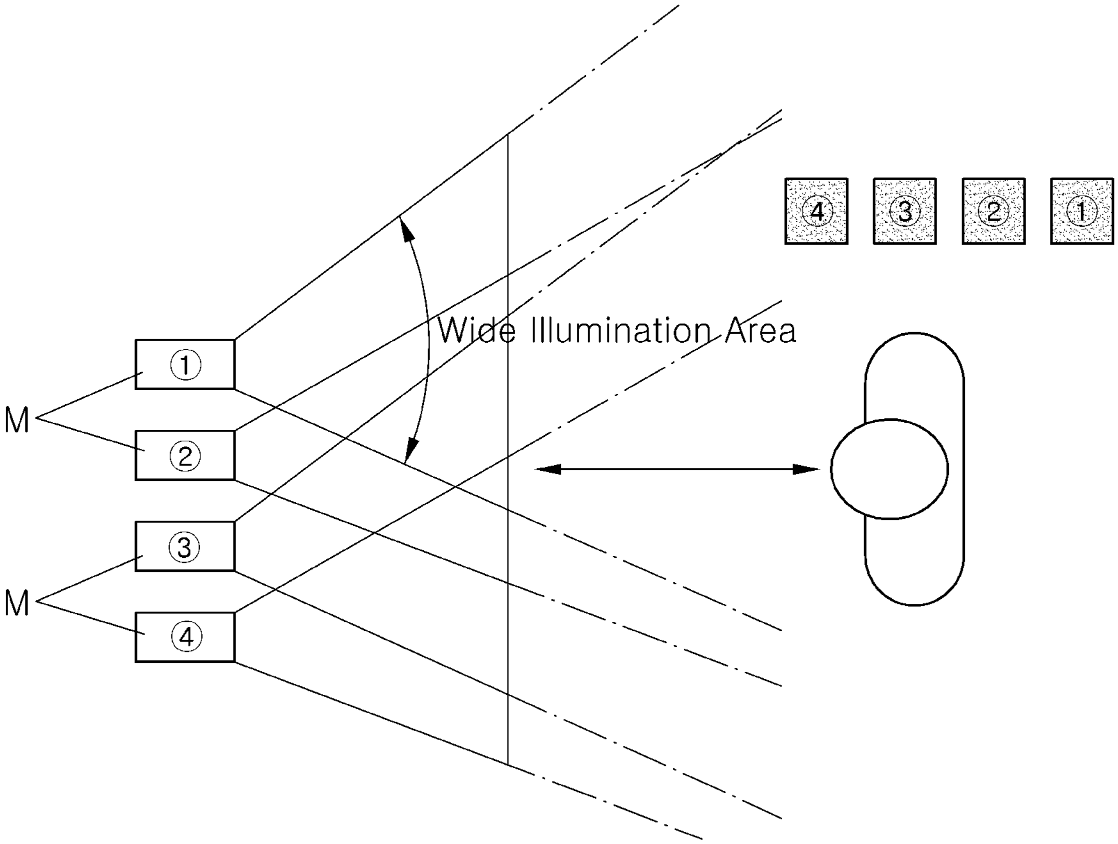
FIG. 7 is a schematic view showing an illumination area in a lamp device including a light emitting module in one form of the present disclosure.

FIG. 7 shows an illumination area in a lamp device including a light emitting module M in some forms of the present disclosure.

Further referring to FIG. 7, the lamp device may include a plurality of light emitting modules M in some forms of the present disclosure. The plurality of light emitting modules M may be arranged in a vertical direction or in a lateral direction.

A lamp device for a vehicle in some forms of the present disclosure may be constituted by a plurality of light emitting modules M. In an embodiment, the plurality of light emitting modules M may be arranged in a lateral direction or may be arranged in a vertical direction.

In some forms of the present disclosure, the light emitting module M may embody a daytime running light (DRL), a low-beam headlamp and a high-beam headlamp as a single module. Accordingly, the illumination area of the light emitting module M may be widened. As a result, an observer positioned in front of the vehicle may observe that all light emitting modules M (①, ②, ③, and ④) are illuminated.

Thus, although the light emitting module M, in which a DRL, a low-beam headlamp and a high-beam headlamp are integrated, is used, a uniform illumination effect may be provided, as compared to conventional cases.

Figure 8:
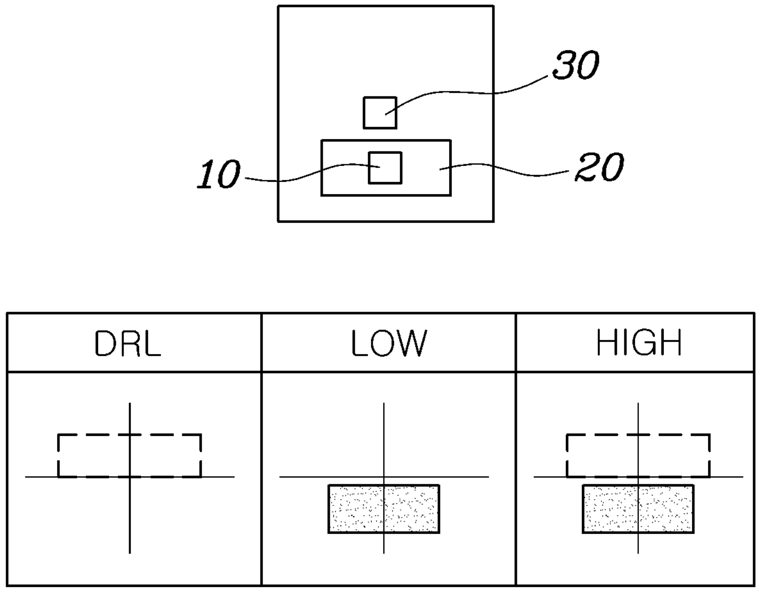
FIGS. 8 and 9 are schematic views showing illumination areas of light emitting modules in one form of the present disclosure and lamp devices including the light emitting modules.
Figure 9:
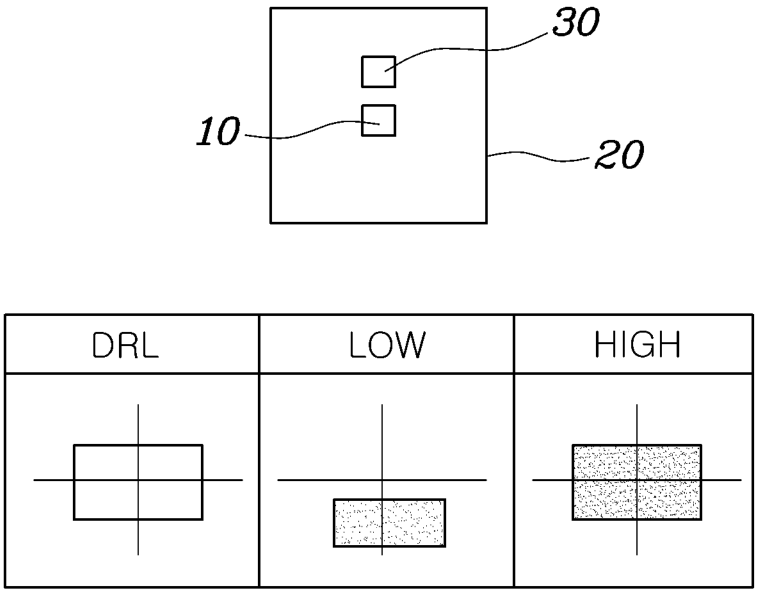

FIGS. 8 and 9 show illumination areas of light emitting modules M in some forms of the present disclosure and lamp devices including the light emitting modules M.

Further referring to FIGS. 8 and 9, a DRL may be illuminated by light generated from the first light source 10.

In addition, a low-beam headlamp may be illuminated by light generated from the second light source 30.

Furthermore, a high-beam headlamp may be illuminated by light generated from the first light source 10 and light generated from the second light source 10 or may be illuminated by the light generated from the first light source 10.

As shown in FIG. 8, the cross-section of the light condenser 20 may be formed as a portion of the cross-section of the case 50, and light generated from the first light source 10 may be irradiated in a relatively-upper illumination area, which is an illumination area of the DRL, while passing through the light condenser 20 and the lens unit 40.

In addition, light generated from the second light source 30 may be irradiated in a relatively-lower illumination area, which is an illumination area of the low-beam headlamp, while passing through the lens unit 40.

The illumination area of the high-beam headlamp may be illuminated in accordance with simultaneous light generation of the first light source 10 and the second light source 30.

In some forms of the present disclosure, as shown in FIG. 9, the cross-section of the light condenser 20 may be enlarged up to the entire portion of the cross-section of the case 50. Accordingly, light generated from the first light source 10 may be irradiated in an illumination area of the high-beam headlamp widened in a vertical direction.

In this case, light from the first light source 10 may be irradiated in plural steps. As light having a relatively low intensity is generated, the DRL may be illuminated, whereas as light having a relatively high intensity is generated, the high-beam headlamp may be illuminated.

As apparent from the above description, in accordance with a light emitting module for a vehicle in some forms of the present disclosure and a lamp device including the same, both a first light source and a second light source, from which light beams are incident upon a lens unit in different directions, are included in the light emitting module and, as such, there is an effect in which different illumination areas are integrated in a single module.

In addition, the illumination area of the light emitting module is widened and, as such, a uniform illumination effect may be provided, as compared to conventional cases.

Although some forms of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A light emitting module for a vehicle comprising:
- a first light source configured to generate a first light during an operation;
- a light concentrator disposed in a forward direction of the first light and configured to change the forward direction of the first light through reflection or refraction;
- a second light source spaced apart from the first light source and configured to generate a second light in a direction different from the first light; and
- a lens unit disposed in a forward direction of the second light, and configured to change the forward directions of the first light and the second light,
- wherein the lens unit comprises:
  - a primary lens; and
  - a secondary lens,
  - wherein the primary lens is spaced apart from the secondary lens in parallel to the light generation direction of the second light source.

2. The light emitting module according to claim 1, wherein:
- the first light source is disposed backwardly of the second light source in the forward direction of the first light; and
- the light concentrator is configured to condense the first light.

3. The light emitting module according to claim 1, wherein:
- the first light source is configured to generate the first light in a direction different from the second light; and
- the light concentrator comprises a total reflection lens bent to change the forward direction of the first light toward the lens unit and to reflect the first light.

4. The light emitting module according to claim 1, wherein:
- the first light source is configured to generate the first light in a direction different from the second light; and
- the light concentrator is configured to change the forward direction of the first light to advance the first light to the lens unit.

5. The light emitting module according to claim 4, wherein the light concentrator further comprises:
- a curved reflective surface configured to reflect the first light to advance the first light to the lens unit.

6. The light emitting module according to claim 5, wherein the curved reflective surface is formed along a parabola having a focus corresponding to the first light source, and extends between the second light source and the lens unit.

7. The light emitting module according to claim 1, wherein the first light source is spaced apart from the second light source in a direction crossing the light generation direction of the second light source.

8. The light emitting module according to claim 1, wherein the light concentrator is configured not to interfere with the second light.

9. The light emitting module according to claim 1, wherein:
- the primary lens is configured to condense the first light or the second light; and
- the secondary lens is configured to refract the first light or the second light passing through the primary lens in a particular direction.

10. The light emitting module according to claim 1, wherein a first illumination area in which the first light passing through the lens unit is irradiated is different from a second illumination area in which the second light is irradiated.

11. A lamp device for a vehicle comprising:
- a plurality of light emitting modules comprising a light emitting module, the light emitting module comprising:
  - a first light source configured to generate a first light during an operation;
  - a light concentrator disposed in a forward direction of the first light and configured to change the forward direction of the first light through reflection or refraction;
  - a second light source spaced apart from the first light source and configured to generate a second light in a direction different from the first light; and
  - a lens unit disposed in a forward direction of the second light, and configured to change the forward directions of the first light and the second light,
  - wherein the lens unit comprises:
    - a primary lens; and
    - a secondary lens,
    - wherein the primary lens is spaced apart from the secondary lens in parallel to the light generation direction of the second light source,
- wherein the plurality of light emitting modules is arranged in a vertical direction or in a lateral direction.

12. The lamp device according to claim 11, wherein a daytime running lamp is illuminated by the first light.

13. The lamp device according to claim 11, wherein a low-beam headlamp is illuminated by the second light.

14. The lamp device according to claim 11, wherein a high-beam headlamp is illuminated by the first light and the second light or illuminated by the first light.

* * * * *